United States Patent
Kim et al.

(10) Patent No.: US 12,489,125 B2
(45) Date of Patent: Dec. 2, 2025

(54) FUEL CELL SYSTEM

(71) Applicants: HYUNDAI MOTOR COMPANY, Seoul (KR); KIA CORPORATION, Seoul (KR)

(72) Inventors: Hak Yoon Kim, Incheon (KR); Hyeon Seok Ban, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 501 days.

(21) Appl. No.: 18/110,021

(22) Filed: Feb. 15, 2023

(65) Prior Publication Data

US 2024/0105971 A1    Mar. 28, 2024

(30) Foreign Application Priority Data

Sep. 26, 2022    (KR) .................. 10-2022-0121502

(51) Int. Cl.
*H01M 8/04089*    (2016.01)
*H01M 8/04746*    (2016.01)

(52) U.S. Cl.
CPC ... *H01M 8/04104* (2013.01); *H01M 8/04753* (2013.01)

(58) Field of Classification Search
CPC .............................................. H01M 8/04104
See application file for complete search history.

(56) References Cited

U.S. PATENT DOCUMENTS

2015/0030948 A1    1/2015    Ikezoe et al.
2017/0250423 A1*   8/2017    Koiwa .............. H01M 8/04141

FOREIGN PATENT DOCUMENTS

| JP | 2005174757 A | 6/2005 |
| JP | 4917796 B2 | 2/2012 |
| JP | 5915730 B2 | 4/2016 |
| KR | 101361414 B1 | 2/2014 |

* cited by examiner

*Primary Examiner* — Brian R Ohara
(74) *Attorney, Agent, or Firm* — Lempia Summerfield Katz LLC

(57) ABSTRACT

A fuel cell system includes a fuel cell stack including a cathode to which air is supplied, and an anode to which hydrogen is supplied. In particular, the fuel cell system further includes: an air discharge line to discharge the air discharged from the fuel cell stack into the atmosphere; a pressure adjuster provided in the air discharge line to selectively open or close the air discharge line; a first hydrogen discharge line connected to the fuel cell stack and the air discharge line at an upstream side of the pressure adjuster; a second hydrogen discharge line connected to the first hydrogen discharge line and the air discharge line at a downstream side of the pressure adjuster; and a hydrogen discharge valve part to selectively open or close at least one of the first hydrogen discharge line or the second hydrogen discharge line based on a pressure of the anode.

18 Claims, 8 Drawing Sheets

FUEL CELL SYSTEM

CROSS-REFERENCE TO RELATED APPLICATION

This application claims priority to and the benefit of Korean Patent Application No. 10-2022-0121502, filed in the Korean Intellectual Property Office on Sep. 26, 2022, the entire contents of which are incorporated herein by reference.

TECHNICAL FIELD

The present disclosure relates to a fuel cell system, and more particularly, to a fuel cell system capable of improving stability and reliability.

BACKGROUND ART

A fuel cell electric vehicle (FCEV) produces electrical energy from an electrochemical reaction between oxygen and hydrogen in a fuel cell stack and travels by operating a motor.

The fuel cell electric vehicle may continuously generate electricity, regardless of a capacity of a battery, by being supplied with fuel (hydrogen) and air from the outside, and thus has high efficiency, and emits almost no contaminant. By virtue of these advantages, continuous research and development is being conducted on the fuel cell electric vehicle.

In general, the fuel cell electric vehicle may include a fuel cell stack configured to generate electricity by means of an oxidation-reduction reaction between hydrogen and oxygen, a fuel supply device configured to supply fuel (hydrogen) to the fuel cell stack, and an air supply device configured to supply the fuel cell stack with reaction air (oxygen) which is an oxidant required for an electrochemical reaction.

Meanwhile, when a concentration of hydrogen in the fuel cell stack decreases to a predetermined level or lower, the performance and operational efficiency of the fuel cell stack may deteriorate. Therefore, a purge process (a process of discharging hydrogen remaining in the fuel cell stack) needs to be periodically performed to adjust the concentration of hydrogen in the fuel cell stack.

In the related art, there has been proposed a method of discharging hydrogen, which is discharged from an anode of the fuel cell stack, to the outside along an exhaust line via a humidifier together with air discharged from a cathode of the fuel cell stack at the time of performing the purge process on the fuel cell stack.

However, in the related art, a hydrogen discharge line, through which hydrogen is discharged from the fuel cell stack, is connected to the exhaust line (the humidifier) at an upstream side of a pressure adjuster (a cathode pressure adjustment valve) provided in the exhaust line. For this reason, there is a problem in that a pressure of the cathode fluctuates because of a discharge flow rate (a hydrogen purge flow rate) of hydrogen introduced into the humidifier along the hydrogen discharge line. Further, there is a problem in that a pressure of the anode also becomes unstable because the pressure of the anode is controlled on the basis of the pressure of the cathode. For this reason, there is a problem in that the output of the fuel cell stack becomes unstable.

Moreover, in the related art, there is a problem in that in case that hydrogen introduced into the humidifier along the hydrogen discharge line is introduced into the cathode, corrosion of a separator accelerates, and durability and reactivity of the fuel cell stack deteriorate.

Meanwhile, in the related art, there has been proposed a method of connecting the hydrogen discharge line, through which hydrogen is discharged from the fuel cell stack, to the exhaust line (directly to the exhaust line without passing through the humidifier) at a downstream side of the pressure adjuster (the cathode pressure adjustment valve) provided in the exhaust line.

However, in the related art, there is a problem in that a discharge flow rate of hydrogen discharged along the exhaust line (a hydrogen discharge flow rate during a normal operation of the fuel cell stack) is excessively increased by a very large pressure difference (e.g., 100 kPa or more) between the anode and an outlet of the exhaust line (the downstream side of the pressure adjuster) to which the atmospheric pressure is applied. For this reason, there is a problem in that the excessive increase in discharge flow rate of hydrogen causes a pressure drop of the anode, which degrades control stability of the fuel cell stack.

Moreover, to improve the accuracy of the discharge flow rate of hydrogen discharged along the hydrogen discharge line, a cross-sectional area of an orifice (i.e., a cross-sectional area of the orifice through which hydrogen passes) of a valve for opening or closing the hydrogen discharge line needs to be very small. However, when the cross-sectional area of the orifice of the valve becomes very small, there is a problem in that condensate water, which passes through the valve, is frozen in a state in which the condensate water is stuck in the orifice of the valve in the winter season in which the atmospheric temperature is low.

SUMMARY

The present disclosure has been made in an effort to provide a fuel cell system capable of improving stability and reliability.

In particular, the present disclosure has been made in an effort to ensure a smooth discharge of hydrogen from a fuel cell stack and improve stability and reliability.

Among other things, the present disclosure has been made in an effort to selectively switch a discharge path for hydrogen on the basis of a pressure of an anode. The discharge path may be defined as a discharge path for hydrogen along an upstream side of a pressure adjuster provided in an air discharge line, or a discharge path for hydrogen along the upstream side and a downstream side of the pressure adjuster.

The present disclosure has also been made in an effort to minimize fluctuations of pressures of a cathode and an anode and stably ensure an output of a fuel cell stack.

The present disclosure has also been made in an effort to improve durability of a fuel cell stack.

The present disclosure has also been made in an effort to more efficiently control working pressures of a cathode and an anode and improve the degrees of freedom of the working pressures of the cathode and the anode.

The present disclosure has also been made in an effort to adjust a discharge flow rate without providing a separate valve control logic.

The objects to be achieved by the embodiments are not limited to the above-mentioned objects, but also include objects or effects that may be understood from the solutions or embodiments described below.

In an embodiment of the present disclosure, a fuel cell system includes a fuel cell stack including: a cathode to which air is supplied, and an anode to which hydrogen is supplied. The fuel cell system further includes: an air discharge line through which the air discharged from the fuel cell stack is discharged into the atmosphere; a pressure adjuster provided in the air discharge line and configured to selectively open or close the air discharge line; and a first hydrogen discharge line. The first hydrogen discharge line includes: a first end connected to the fuel cell stack, and a second end connected to the air discharge line at an upstream side of the pressure adjuster. The fuel cell system further includes a second hydrogen discharge line having a first end connected to the first hydrogen discharge line, and a second end connected to the air discharge line at a downstream side of the pressure adjuster. The fuel cell system further includes: a hydrogen discharge valve part configured to selectively open or close at least one of the first hydrogen discharge line or the second hydrogen discharge line based on a pressure of the anode.

The present disclosure improves stability and reliability of the fuel cell system.

In the related art, a hydrogen discharge line, through which hydrogen is discharged from the fuel cell stack, is connected to the exhaust line (the humidifier) at an upstream side of a pressure adjuster (e.g., a cathode pressure adjustment valve) provided in the exhaust line. For this reason, there is a problem in that a pressure of the cathode fluctuates because of a discharge flow rate (a hydrogen purge flow rate) of hydrogen introduced into the humidifier along the hydrogen discharge line. Further, there is a problem in that a pressure of the anode also becomes unstable because the pressure of the anode is controlled on the basis of the pressure of the cathode. For this reason, there is a problem in that the output of the fuel cell stack becomes unstable. Moreover, in the related art, there is a problem in that in case that hydrogen introduced into the humidifier along the hydrogen discharge line is introduced into the cathode, corrosion of a separator accelerates, and durability and reactivity of the fuel cell stack deteriorate.

Meanwhile, in the related art, there has been proposed a method of connecting the hydrogen discharge line, through which hydrogen is discharged from the fuel cell stack, to the exhaust line (i.e., directly to the exhaust line without passing through the humidifier) at a downstream side of the pressure adjuster (e.g., the cathode pressure adjustment valve) provided in the exhaust line. However, there is a problem in that a discharge flow rate of hydrogen discharged along the exhaust line (i.e., a hydrogen discharge flow rate during a normal operation of the fuel cell stack) is excessively increased by a very large pressure difference (e.g., 100 kPa or more) between the anode and an outlet of the exhaust line (i.e., the downstream side of the pressure adjuster) to which the atmospheric pressure is applied. For this reason, there is a problem in that the excessive increase in discharge flow rate of hydrogen causes a pressure drop of the anode, which degrades control stability of the fuel cell stack. Moreover, to improve the accuracy of the discharge flow rate of hydrogen discharged along the hydrogen discharge line, a cross-sectional area of an orifice (i.e., a cross-sectional area of the orifice through which hydrogen passes) of a valve for opening or closing the hydrogen discharge line needs to be very small. However, when the cross-sectional area of the orifice of the valve becomes very small, there is a problem in that condensate water, which passes through the valve, is frozen in a state in which the condensate water is stuck in the orifice of the valve in the winter season in which the atmospheric temperature is low.

In contrast, according to the embodiment of the present disclosure, at least one of the first hydrogen discharge line or the second hydrogen discharge line is selectively opened or closed based on the pressure of the anode. Therefore, it is possible to obtain an advantageous effect of ensuring a smooth discharge of hydrogen in accordance with the pressure of the anode (i.e., the operating condition of the fuel cell stack) and improving the stability and reliability.

Among other things, according to the embodiment of the present disclosure, based on the pressure of the anode, the path through which the hydrogen is discharged may be defined along the first hydrogen discharge line (e.g., the upstream side of the pressure adjuster) or defined along the first hydrogen discharge line (e.g., the upstream side of the pressure adjuster) and the second hydrogen discharge line (e.g., the downstream side of the pressure adjuster). Therefore, it is possible to obtain an advantageous effect of minimizing the fluctuations of the pressures of the cathode and the anode and stably ensuring the output of the fuel cell stack regardless of the operating condition of the fuel cell stack (e.g., the normal operation vs. a purge process).

Moreover, according to the embodiment of the present disclosure, it is possible to obtain an advantageous effect of preventing the hydrogen, introduced into the humidifier along the hydrogen discharge line, from being introduced into the cathode. Further, it is possible to obtain an advantageous effect of preventing corrosion of the separator caused by the introduction of hydrogen into the cathode and improving the durability and reactivity of the fuel cell stack.

The hydrogen discharge valve part may have various structures capable of selectively opening or closing at least one of the first hydrogen discharge line or the second hydrogen discharge line.

According to the embodiment of the present disclosure, the hydrogen discharge valve part may include: a first valve provided in the first hydrogen discharge line and configured to selectively open or close the first hydrogen discharge line based on a first critical pressure; and a second valve provided in the second hydrogen discharge line and configured to selectively open or close the second hydrogen discharge line based on a second critical pressure different from the first critical pressure.

Various valves capable of opening or closing the first hydrogen discharge line may be used as the first valve.

In another embodiment of the present disclosure, a check valve, which operates (i.e., opens or closes the first hydrogen discharge line) based on the first critical pressure, may be used as the first valve.

Because the check valve, which may be automatically opened or closed based on the first critical pressure, is used as the first valve as described above, a separate logic and device is not necessary to control a timing for opening or closing the first hydrogen discharge line. Therefore, it is possible to obtain an advantageous effect of simplifying the structure and operational structure of the first valve.

The first critical pressure of the first valve may be variously changed in accordance with required conditions and design specifications.

According to the embodiment of the present disclosure, the first critical pressure may be defined to correspond to a differential pressure between a working pressure of the anode and a working pressure of the cathode.

Because the first critical pressure is defined to correspond to the differential pressure between the working pressure of the anode and the working pressure of the cathode as described above, the first valve may maintain the opened state of the first hydrogen discharge line at ordinary times, and the condensate water may be mainly discharged along the first hydrogen discharge line during the normal operation of the fuel cell stack.

Various valves capable of opening or closing the second hydrogen discharge line may be used as the second valve.

According to one embodiment of the present disclosure, a check valve, which operates (i.e., opens or closes the second hydrogen discharge line) based on the second critical pressure, may be used as the second valve.

Because the check valve, which may be automatically opened or closed on the basis of the second critical pressure, is used as the second valve as described above, a separate logic and device is not necessary to control a timing for opening or closing the second hydrogen discharge line. Therefore, it is possible to obtain an advantageous effect of simplifying the structure and operational structure of the second valve.

The second critical pressure of the second valve may be variously changed in accordance with required conditions and design specifications.

According to another embodiment of the present disclosure, the second critical pressure may be higher than the first critical pressure.

In particular, the second critical pressure may be defined to be higher than a maximum working pressure of the anode. Because the second critical pressure is defined to be higher than the maximum working pressure of the anode as described above, the second valve may maintain the closed state of the second hydrogen discharge line under a normal operating condition of the fuel cell stack, and the second valve may temporarily open the second hydrogen discharge line only during the purge process in which the working pressure of the anode is set to be higher than the second critical pressure.

The cross-sectional areas of the orifices of the first and second valves may be variously changed in accordance with required conditions and design specifications.

According to an embodiment of the present disclosure, the first valve may have a first orifice cross-sectional area through which hydrogen passes, and the second valve may have a second orifice cross-sectional area different from the first orifice cross-sectional area.

According to an embodiment of the present disclosure, the second orifice cross-sectional area may be defined to be larger than the first orifice cross-sectional area.

According to an embodiment of the present disclosure, the fuel cell system may include a third hydrogen discharge line in addition to the first hydrogen discharge line and the second hydrogen discharge line. The third hydrogen discharge line has one end connected to the first hydrogen discharge line, and the other end connected to the air discharge line at the downstream side of the pressure adjuster. The hydrogen discharge valve part may include a third valve provided in the third hydrogen discharge line and selectively open or close the third hydrogen discharge line on the basis of a third critical pressure different from the first critical pressure and the second critical pressure.

The third critical pressure of the third valve may be variously changed in accordance with required conditions and design specifications.

According to an embodiment of the present disclosure, the second critical pressure may be defined to be higher than the first critical pressure, and the third critical pressure may be defined to be different from the second critical pressure and higher than the first critical pressure. For example, the third critical pressure may be defined to be higher than the second critical pressure.

A cross-sectional area of an orifice (a third orifice cross-sectional area) of the third valve may be variously changed in accordance with required conditions and design specifications.

According to another embodiment of the present disclosure, the first valve may have the first orifice cross-sectional area through which hydrogen passes, the second valve may have the second orifice cross-sectional area different from the first orifice cross-sectional area, and the third valve may have the third orifice cross-sectional area different from the first orifice cross-sectional area and the second orifice cross-sectional area.

In particular, the second orifice cross-sectional area may be defined to be larger than the first orifice cross-sectional area, and the third orifice cross-sectional area may be defined to be different from the second orifice cross-sectional area and larger than the first orifice cross-sectional area.

According to an embodiment of the present disclosure, the hydrogen discharge valve part may include a three-way valve provided in the first hydrogen discharge line and connected to the second hydrogen discharge line. In particular, the three-way valve may include: a first port connected to the first hydrogen discharge line so that the hydrogen discharged from the fuel cell stack is introduced into the first port; a second port configured to guide the hydrogen passing through the first port to the first hydrogen discharge line at an upstream side of the pressure adjuster. The second port is configured to be selectively opened or closed on the basis of a first critical pressure. The three-way valve further include a third port connected to the second hydrogen discharge line and configured to be selectively opened or closed on the basis of a second critical pressure different from the first critical pressure.

According to an embodiment of the present disclosure, the second critical pressure of the third port may be defined to be higher than the first critical pressure of the second port.

According to another embodiment of the present disclosure, the first critical pressure of the second port may be defined to correspond to the differential pressure between the working pressure of the anode and the working pressure of the cathode (i.e., first critical pressure=working pressure of anode−working pressure of cathode).

In particular, the second critical pressure of the third port may be defined to be higher than the maximum working pressure of the anode.

BRIEF DESCRIPTION OF THE DRAWINGS

In order that the disclosure may be well understood, there should now be described various forms thereof, given by way of example, reference being made to the accompanying drawings, in which.

DETAILED DESCRIPTION

Hereinafter, embodiments of the present disclosure are described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, or C" may include one or more of all combinations that can be made by combining A, B, and C.

In addition, the terms such as first, second, A, B, (a), and (b) may be used to describe constituent elements of the embodiments of the present disclosure. When a component, device, element, or the like of the present disclosure is described as having a purpose or performing an operation, function, or the like, the component, device, or element should be considered herein as being "configured to" meet that purpose or to perform that operation or function.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Figure 1:
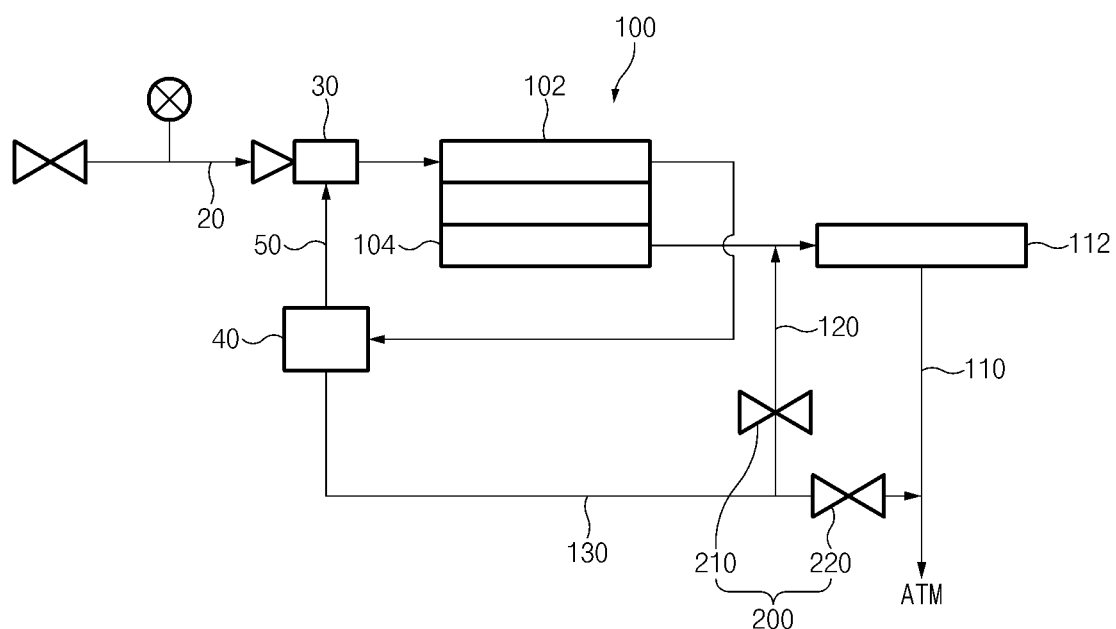
FIG. 1 is a view illustrating a fuel cell system according to an embodiment of the present disclosure.
Figure 5:
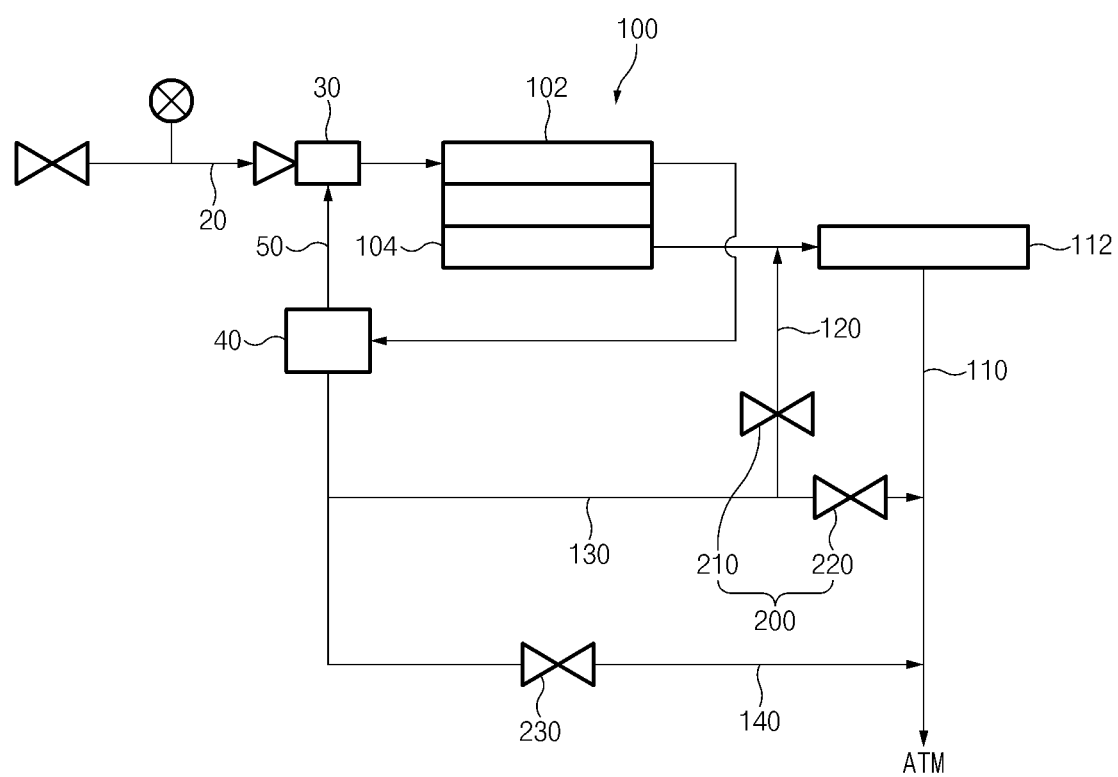
FIG. 5 is a view illustrating a third hydrogen discharge line and a third valve in the fuel cell system according to an embodiment of the present disclosure.

Referring to FIGS. 1 and 5, a fuel cell system 10 according to an embodiment of the present disclosure includes: a fuel cell stack 100 including a cathode 104 to which air is supplied and an anode 102 to which hydrogen is supplied. The fuel cell system 10 further includes: an air discharge line 110 through which the air discharged from the fuel cell stack 100 is discharged into the atmosphere; a pressure adjuster 112 provided in the air discharge line 110 and configured to selectively open or close the air discharge line 110; and a first hydrogen discharge line 120 having one end connected to the fuel cell stack 100 and the other end connected to the air discharge line 110 at an upstream side of the pressure adjuster 112. The fuel cell system 10 further includes: a second hydrogen discharge line 130 having one end connected to the first hydrogen discharge line 120 and the other end connected to the air discharge line 110 at a downstream side of the pressure adjuster 112; and a hydrogen discharge valve part 200 configured to selectively open or close at least one of the first hydrogen discharge line 120 or the second hydrogen discharge line 130 on the basis of a pressure of the anode 102.

For reference, the fuel cell system 10 according to the embodiment of the present disclosure may be applied to various vehicles (e.g., construction machines or passenger vehicles), ships, mobility vehicles in aerospace fields to which the fuel cell stack 100 may be applied. The present disclosure is not restricted or limited by the type and properties of an object to which the fuel cell system 10 is applied.

The fuel cell stack 100 refers to a kind of power generation device that generates electrical energy through a chemical reaction of fuel (e.g., hydrogen). The fuel cell stack 100 may be configured by stacking several tens or hundreds of fuel cells (unit cells) (not illustrated) in series.

The fuel cell may have various structures capable of producing electricity by means of an oxidation-reduction reaction between fuel (e.g., hydrogen) and an oxidant (e.g., air).

For example, the fuel cell may include: a membrane electrode assembly (MEA) (not illustrated) having catalyst electrode layers in which electrochemical reactions occur and which are attached to two opposite sides of an electrolyte membrane through which hydrogen ions move; a gas diffusion layer (GDL) (not illustrated) configured to uniformly distribute reactant gases and transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell, hydrogen, which is fuel, and air (oxygen), which is an oxidant, are supplied to an anode 102 and a cathode 104 of the membrane electrode assembly, respectively, through flow paths in the separator, such that the hydrogen is supplied to the anode 102, and the air is supplied to the cathode 104.

The hydrogen supplied to the anode 102 is decomposed into hydrogen ions (protons) and electrons by catalysts in the electrode layers provided at two opposite sides of the electrolyte membrane. Only the hydrogen ions are selectively transmitted to the cathode 104 through the electrolyte membrane, which is a cation exchange membrane, and at the same time, the electrons are transmitted to the cathode 104 through the gas diffusion layer and the separator which are conductors.

At the cathode 104, the hydrogen ions supplied through the electrolyte membrane and the electrons transmitted through the separator meet oxygen in the air supplied to the cathode 104 by an air supply device, thereby creating a reaction of producing water. As a result of the movement of the hydrogen ions, the electrons flow through external conductive wires, and the electric current is generated as a result of the flow of the electrons.

An air supply line (not illustrated) may be connected to the fuel cell stack 100. The air compressed by an air compressor (not illustrated) may be supplied to the cathode 104 of the fuel cell stack 100 along the air supply line.

The air supply line may have various structures capable of connecting the air compressor and the fuel cell stack 100. The present disclosure is not restricted or limited by the structure of the air supply line.

In addition, a hydrogen supply line 20 may be connected to the fuel cell stack 100. The hydrogen supplied from a hydrogen storage (not illustrated) may be supplied to the anode 102 of the fuel cell stack 100 through an ejector 30 provided in the hydrogen supply line 20.

The hydrogen supply line 20 may have various structures capable of connecting the hydrogen storage and the fuel cell stack 100. The present disclosure is not restricted or limited by the structure and shape of the hydrogen supply line 20.

The air discharge line 110 is configured to discharge, into the atmosphere (to the outside), the air (air and condensate water) discharged from the fuel cell stack 100 (the cathode) and the hydrogen (hydrogen and condensate water) discharged from the fuel cell stack 100.

For example, the air discharge line 110 may pass through a humidifier (not illustrated) configured to humidify the air to be supplied to the fuel cell stack 100 (perform a process of increasing the humidity of the air). An outlet end of the air discharge line 110 may be exposed to the atmosphere.

For reference, the humidifier may be configured to humidify air (dry air) to be supplied to the fuel cell stack 100 by using air (moist air) discharged from the fuel cell stack 100. According to another embodiment of the present disclosure, the air discharge line may be configured to discharge the air, which is discharged from the fuel cell stack, directly into the atmosphere without passing through the humidifier.

The air discharge line 110 may have various structures capable of discharging air and hydrogen to the outside. The present disclosure is not restricted or limited by the structure and shape of the air discharge line 110.

The pressure adjuster (the air pressure control valve) 112 is provided in the air discharge line 110 and configured to form a backpressure in the fuel cell stack 100.

Various valves capable of selectively opening or closing the air discharge line 110 may be used as the pressure adjuster 112. The present disclosure is not restricted or limited by the type and structure of the pressure adjuster 112.

The first hydrogen discharge line 120 is configured to guide the hydrogen, which is discharged from the fuel cell stack 100, to the air discharge line 110 at the upstream side of the pressure adjuster 112.

More specifically, one end of the first hydrogen discharge line 120 may be connected to the fuel cell stack 100 (e.g., an outlet of the anode), and the other end of the first hydrogen discharge line 120 may be connected to the air discharge line 110 at the upstream side of the pressure adjuster 112 (e.g., between the outlet of the anode and the pressure adjuster). The hydrogen discharged from the fuel cell stack 100 may be supplied to the air discharge line 110 at the upstream side of the pressure adjuster 112 along the first hydrogen discharge line 120 and then discharged to the outside (into the atmosphere).

For example, the other end of the first hydrogen discharge line 120 may be connected to the humidifier. The hydrogen discharged along the first hydrogen discharge line 120 may be supplied to the air discharge line 110 via the humidifier. According to another embodiment of the present disclosure, the hydrogen discharged along the first hydrogen discharge line may be supplied to the air discharge line without passing through the humidifier.

The first hydrogen discharge line 120 may have various structures capable of connecting the fuel cell stack 100 (e.g., the outlet of the anode) and the air discharge line 110. The present disclosure is not restricted or limited by the structure and shape of the first hydrogen discharge line 120.

In addition, a water trap 40 may be provided in the first hydrogen discharge line 120 and trap condensate water contained in unreacted hydrogen discharged from the fuel cell stack 100. The hydrogen passing through the water trap 40 may be supplied back to the fuel cell stack 100 along a recirculation line 50 connected to the water trap 40.

The second hydrogen discharge line 130 is configured to guide the hydrogen, which is discharged from the fuel cell stack 100, to the air discharge line 110 at the downstream side of the pressure adjuster 112.

More specifically, one end of the second hydrogen discharge line 130 may be connected to the first hydrogen discharge line 120, and the other end of the second hydrogen discharge line 130 may be connected to the air discharge line 110 at the downstream side of the pressure adjuster 112. The hydrogen discharged from the fuel cell stack 100 (i.e., the hydrogen discharged along the first hydrogen discharge line) may be supplied to the air discharge line 110 at the downstream side of the pressure adjuster 112 along the second hydrogen discharge line 130 and then discharged to the outside (into the atmosphere).

A connection point of the second hydrogen discharge line 130 connected to the first hydrogen discharge line 120 may be variously changed in accordance with required conditions and design specifications.

For example, one end of the second hydrogen discharge line 130 may be connected to the first hydrogen discharge line 120 at a portion between the water trap 40 and an outlet end of the first hydrogen discharge line 120. According to another embodiment of the present disclosure, one end of the second hydrogen discharge line may be connected to the first hydrogen discharge line at a portion between the outlet of the anode and the water trap.

The second hydrogen discharge line 130 may have various structures capable of connecting the first hydrogen discharge line 120 and the air discharge line 110. The present disclosure is not restricted or limited by the structure and shape of the second hydrogen discharge line 130.

The hydrogen discharge valve part 200 is configured to selectively open or close at least one of the first hydrogen discharge line 120 or the second hydrogen discharge line 130 on the basis of the pressure of the anode 102.

For reference, in the embodiment of the present disclosure, the operation of opening or closing the first hydrogen discharge line 120 and the second hydrogen discharge line 130 may include both an operation of turning on or off a flow of hydrogen discharged along the first hydrogen discharge line 120 and the second hydrogen discharge line 130 and an operation of adjusting a flow rate of hydrogen discharged along the first hydrogen discharge line 120 and the second hydrogen discharge line 130.

This is to discharge hydrogen along only the first hydrogen discharge line 120 or both the first hydrogen discharge line 120 and the second hydrogen discharge line 130 in accordance with the pressure of the anode 102 (a discharge pressure or flow rate of hydrogen).

In other words, in case that the hydrogen discharged from the fuel cell stack 100 is discharged only to the first hydrogen discharge line 120, there is a problem in that a pressure of the cathode 104 fluctuates because of a discharge flow rate (e.g., a hydrogen purge flow rate) of hydrogen introduced into the humidifier along the hydrogen discharge line. Further, there is a problem in that a pressure of the anode 102 also becomes unstable because the pressure of the anode 102 is controlled on the basis of the pressure of the cathode 104. For this reason, there is a problem in that the output of the fuel cell stack 100 becomes unstable. Moreover, in case that the hydrogen introduced into the humidifier along the first hydrogen discharge line 120 is introduced into the cathode 104, there is a problem in that corrosion of the separator accelerates, and the durability and reactivity of the fuel cell stack 100 deteriorate.

On the contrary, in case that the hydrogen discharged from the fuel cell stack 100 is discharged only to the second hydrogen discharge line 130, there is a problem in that a discharge flow rate of hydrogen discharged along the exhaust line (i.e., the air discharge line 110) (a hydrogen discharge flow rate during the normal operation of the fuel cell stack 100) is excessively increased by a very large pressure difference between the anode 102 and the outlet of the air discharge line 110 (the downstream side of the pressure adjuster) to which the atmospheric pressure is applied. For this reason, there is a problem in that the excessive increase in discharge flow rate of hydrogen causes a pressure drop of the anode 102, which degrades control stability of the fuel cell stack 100. Moreover, to improve the accuracy of the discharge flow rate of hydrogen discharged along the hydrogen discharge line, a cross-sectional area of an orifice (a cross-sectional area of the orifice through which hydrogen passes) of a valve for opening or closing the hydrogen discharge line needs to be very small. However, when the cross-sectional area of the orifice of the valve becomes very small, there is a problem in that condensate water, which passes through the valve, is frozen in a state in which the condensate water is stuck in the orifice of the valve in the winter season in which the atmospheric temperature is low.

However, according to the present disclosure, at least one of the first hydrogen discharge line 120 or the second hydrogen discharge line 130 is selectively opened or closed by the hydrogen discharge valve part 200 on the basis of the pressure of the anode 102. Therefore, in accordance with the pressure of the anode 102 (e.g., the discharge pressure or flow rate of hydrogen), the path, through which hydrogen is discharged, may be defined along the first hydrogen discharge line 120 (the upstream side of the pressure adjuster) or defined along the first hydrogen discharge line 120 (the upstream side of the pressure adjuster) and the second hydrogen discharge line 130 (the downstream side of the pressure adjuster). Therefore, it is possible to smoothly discharge hydrogen at an appropriate flow rate in a state in which the fluctuations of pressures of the cathode 104 and the anode 102 may be minimized regardless of an operating condition of the fuel cell stack 100 (e.g., the normal operation vs. the purge process).

The hydrogen discharge valve part 200 may have various structures capable of selectively opening or closing at least one of the first hydrogen discharge line 120 or the second hydrogen discharge line 130. The present disclosure is not restricted or limited by the structure of the hydrogen discharge valve part 200.

According to an embodiment of the present disclosure, the hydrogen discharge valve part 200 may include: a first valve 210 provided in the first hydrogen discharge line 120 and configured to selectively open or close the first hydrogen discharge line 120 on the basis of a first critical pressure; and a second valve 220 provided in the second hydrogen discharge line 130 and configured to selectively open or close the second hydrogen discharge line 130 on the basis of a second critical pressure different from the first critical pressure.

The first valve 210 is provided in the first hydrogen discharge line 120 and configured to selectively open or close the first hydrogen discharge line 120 on the basis of the first critical pressure.

In this case, the process in which the first valve 210 selectively opens or closes the first hydrogen discharge line 120 on the basis of the first critical pressure is defined as a process in which the first valve 210 opens the first hydrogen discharge line 120 when the pressure of the hydrogen passing through the first hydrogen discharge line 120 (the anode pressure) is a first critical pressure or higher, and the first valve 210 closes the first hydrogen discharge line 120 when the pressure of the hydrogen passing through the first hydrogen discharge line 120 (the anode pressure) is lower than the first critical pressure.

Various valves capable of opening or closing the first hydrogen discharge line 120 may be used as the first valve 210. The present disclosure is not restricted or limited by the type and structure of the first valve 210.

According to an embodiment of the present disclosure, a check valve, which operates (opens or closes the first hydrogen discharge line) on the basis of the first critical pressure, may be used as the first valve 210.

Because the check valve, which may be automatically opened or closed on the basis of the first critical pressure, is used as the first valve 210 as described above, a separate logic and device for controlling a timing for opening or closing the first hydrogen discharge line 120 need not be provided. Therefore, it is possible to obtain an advantageous effect of simplifying the structure and operational structure of the first valve 210. According to another embodiment of the present disclosure, other valves such as a solenoid valve or a butterfly valve may be used as the first valve.

The first critical pressure of the first valve 210 may be variously changed in accordance with required conditions and design specifications. The present disclosure is not restricted or limited by the first critical pressure of the first valve 210.

According to an embodiment of the present disclosure, the first critical pressure may be defined to correspond to a differential pressure between a working pressure of the anode 102 and a working pressure of the cathode 104 (first critical pressure=working pressure of anode−working pressure of cathode).

For reference, the first critical pressure may be determined as a particular value because the differential pressure between the anode 102 and the cathode 104 needs to be always constantly maintained during the operation of the fuel cell stack. In this case, the reason why the differential pressure between the anode 102 and the cathode 104 needs to be always constantly maintained during the operation of the fuel cell stack is to operate the fuel cell under an optimum condition. When a differential pressure between the anode and the cathode occurs, cross-over may occur, and thus it may cause a deterioration in durability of the fuel cell.

Because the first critical pressure is defined to correspond to the differential pressure between the working pressure of the anode 102 and the working pressure of the cathode 104 as described above, the first valve 210 may maintain the opened state of the first hydrogen discharge line 120 at ordinary times, and the condensate water may be mainly discharged along the first hydrogen discharge line 120 during the normal operation of the fuel cell stack 100.

The second valve 220 is provided in the second hydrogen discharge line 130 and configured to selectively open or close the second hydrogen discharge line 130 on the basis of the second critical pressure different from the first critical pressure.

In this case, the process in which the second valve 220 selectively opens or closes the second hydrogen discharge line 130 on the basis of the second critical pressure is defined as a process in which the second valve 220 opens the second hydrogen discharge line 130 when the pressure of the hydrogen passing through the second hydrogen discharge line 130 (the anode pressure) is the second critical pressure or higher, and the second valve 220 closes the second hydrogen discharge line 130 when the pressure of the hydrogen passing through the second hydrogen discharge line 130 (the anode pressure) is lower than the second critical pressure.

Various valves capable of opening or closing the second hydrogen discharge line 130 may be used as the second valve 220. The present disclosure is not restricted or limited by the type and structure of the second valve 220.

According to an embodiment of the present disclosure, a check valve, which operates (opens or closes the second hydrogen discharge line) on the basis of the second critical pressure, may be used as the second valve 220.

Because the check valve, which may be automatically opened or closed on the basis of the second critical pressure, is used as the second valve 220 as described above, a separate logic and device for controlling a timing for opening or closing the second hydrogen discharge line 130 need not be provided. Therefore, it is possible to obtain an advantageous effect of simplifying the structure and operational structure of the second valve 220. According to another embodiment of the present disclosure, other valves such as a solenoid valve or a butterfly valve may be used as the second valve.

The second critical pressure of the second valve 220 may be variously changed in accordance with required conditions and design specifications. The present disclosure is not restricted or limited by the second critical pressure of the second valve 220.

Figure 2:
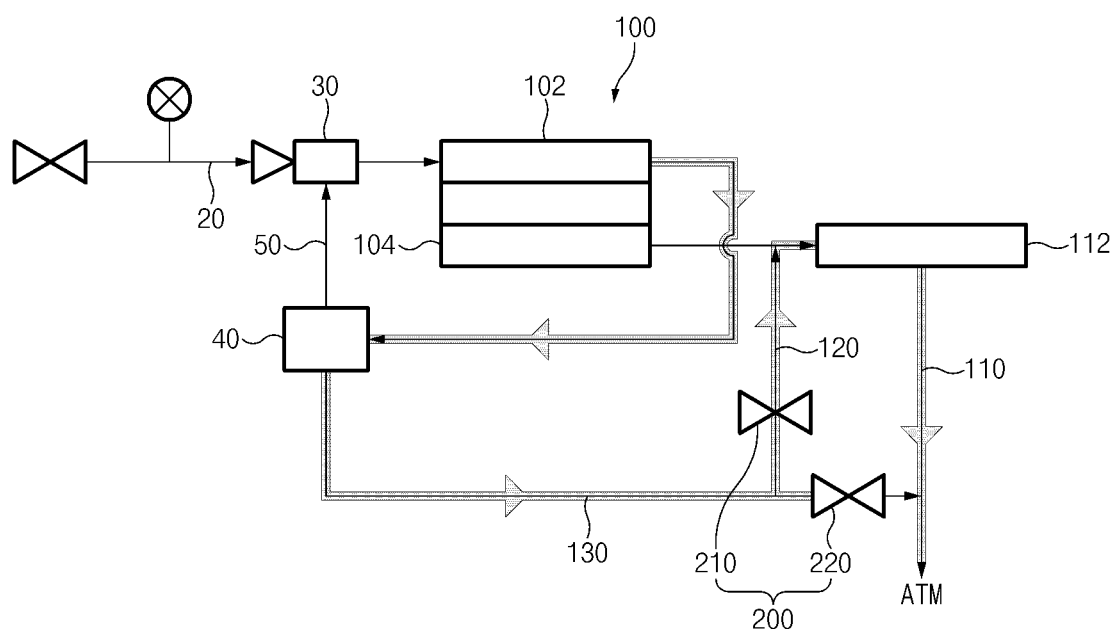
FIGS. 2 and 3 are views illustrating a discharge path for hydrogen made by a hydrogen discharge valve part in the fuel cell system according to an embodiment of the present disclosure.
Figure 3:
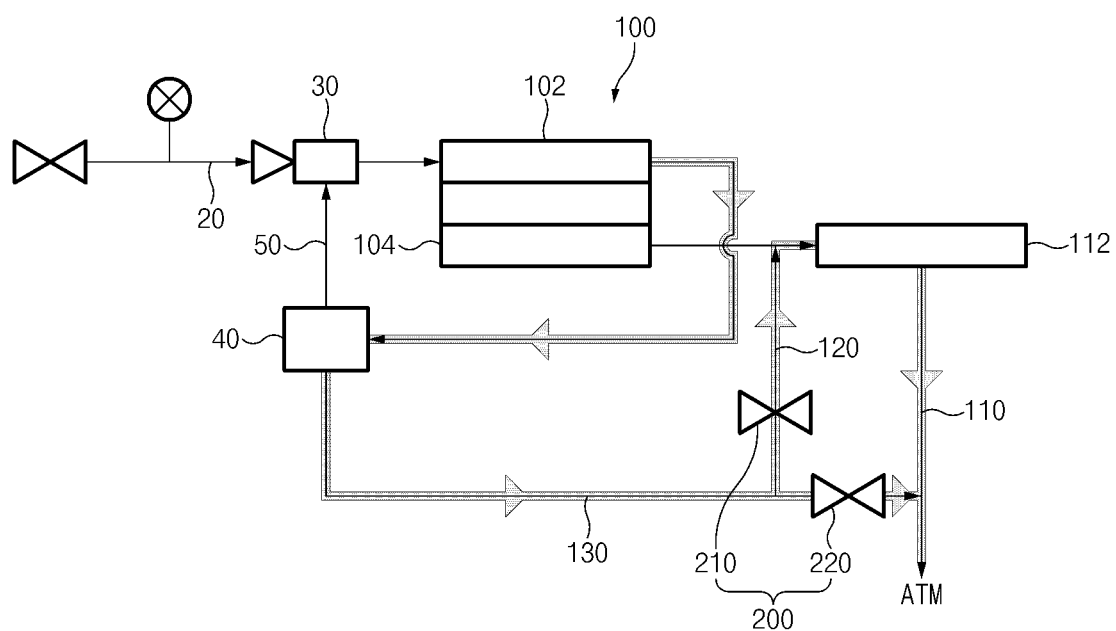
Figure 4:
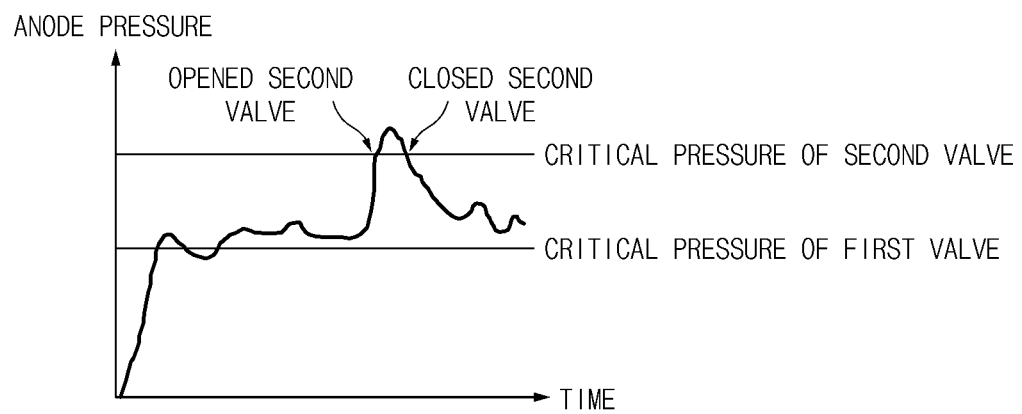
FIG. 4 is a view illustrating a first critical pressure and a second critical pressure in the fuel cell system according to the embodiment of the present disclosure.

Referring to FIGS. 2 to 4, according to an embodiment of the present disclosure, the second critical pressure may be defined to be higher than the first critical pressure.

Because the second critical pressure of the second valve 220 is defined to be higher than the first critical pressure as described above, only the first valve 210 may open the first hydrogen discharge line 120 in the state in which the second valve 220 closes the second hydrogen discharge line 130 in case that the discharge pressure of the hydrogen (the anode pressure) is lower than the second critical pressure.

In contrast, in case that the discharge pressure of the hydrogen (the anode pressure) is higher than the second critical pressure, the second valve 220 may additionally open the second hydrogen discharge line 130 in the state in which the first valve 210 opens the first hydrogen discharge line 120. Meanwhile, the second valve 220 closes the second hydrogen discharge line 130 again when the discharge pressure of the hydrogen (the anode pressure) is lower than the second critical pressure in the state in which the second valve 220 is opened.

In particular, the second critical pressure may be defined to be higher than a maximum working pressure of the anode 102.

In this case, the maximum working pressure of the anode 102 may be understood as a pressure that may be maximally applied to the anode 102 during the normal operation of the fuel cell stack 100.

In particular, the second critical pressure may be defined as a pressure of the anode 102 during the purge process.

Because the second critical pressure is defined to be higher than the maximum working pressure of the anode 102 as described above, the second valve 220 may maintain the closed state of the second hydrogen discharge line 130 under a normal operating condition (general operating condition) of the fuel cell stack 100, and the second valve 220 may temporarily open the second hydrogen discharge line 130 only during the purge process in which the working pressure of the anode 102 is set to be higher than the second critical pressure.

Meanwhile, a cross-sectional area of an orifice of each of the first and second valves 210 and 220 may be variously changed in accordance with required conditions and design specifications. The present disclosure is not restricted or limited by the cross-sectional area of the orifice of each of the first and second valves 210 and 220.

In this case, the cross-sectional area of the orifice of each of the first and second valves 210 and 220 may be understood as a cross-sectional area of a flow path (passageway) through which hydrogen passes when each of the first and second valves 210 and 220 is opened.

According to an embodiment of the present disclosure, the first valve 210 may have a first orifice cross-sectional area through which hydrogen passes. The second valve 220 may have a second orifice cross-sectional area different from the first orifice cross-sectional area. According to another embodiment of the present disclosure, the first orifice cross-sectional area of the first valve and the second orifice cross-sectional area of the second valve may be equal to each other.

In particular, the second orifice cross-sectional area may be defined to be larger than the first orifice cross-sectional area (the first orifice cross-sectional area may be defined to be smaller than the second orifice cross-sectional area).

This is based on the fact that the first valve 210 is maintained in the opened state (the state in which the first hydrogen discharge line is opened) at ordinary times during the operation of the fuel cell stack 100. Because the second orifice cross-sectional area is larger than the first orifice cross-sectional area (the first orifice cross-sectional area is smaller than the second orifice cross-sectional area), it is possible to ensure a high reactivity (a quick purge effect) of the second valve 220 while ensuring the discharge stability of the hydrogen (hydrogen and condensate water) discharged through the first hydrogen discharge line 120 (the hydrogen introduced into the humidifier).

Meanwhile, in the embodiment of the present disclosure illustrated and described above, an example is described in which the hydrogen discharge valve part includes the two valves (the first valve and the second valve). However, according to another embodiment of the present disclosure, the hydrogen discharge valve part may include three or more valves.

For example, referring to FIG. 5, according to an embodiment of the present disclosure, the fuel cell system 10 may include a third hydrogen discharge line 140 in addition to the first hydrogen discharge line 120 and the second hydrogen discharge line 130. The third hydrogen discharge line 140 has one end connected to the first hydrogen discharge line 120, and the other end connected to the air discharge line 110 at the downstream side of the pressure adjuster 112. The hydrogen discharge valve part 200 may include a third valve 230 provided in the third hydrogen discharge line 140 and configured to selectively open or close the third hydrogen discharge line 140 on the basis of a third critical pressure different from the first critical pressure and the second critical pressure.

The third hydrogen discharge line 140 is configured to guide the hydrogen, which is discharged from the fuel cell stack 100, to the air discharge line 110 at the downstream side of the pressure adjuster 112, independently of the second hydrogen discharge line 130.

More specifically, one end of the third hydrogen discharge line 140 may be connected to the first hydrogen discharge line 120, and the other end of the third hydrogen discharge line 140 may be connected to the air discharge line 110 at the downstream side of the pressure adjuster 112. The hydrogen discharged from the fuel cell stack 100 (the hydrogen discharged along the first hydrogen discharge line) may be supplied to the air discharge line 110 at the downstream side of the pressure adjuster 112 along the third hydrogen discharge line 140 and then discharged to the outside (into the atmosphere).

A connection point of the third hydrogen discharge line 140 connected to the first hydrogen discharge line 120 may be variously changed in accordance with required conditions and design specifications.

For example, one end of the second hydrogen discharge line 130 may be connected to the first hydrogen discharge line 120 at a portion between the water trap 40 and the first valve 210.

The third hydrogen discharge line 140 may have various structures capable of connecting the first hydrogen discharge line 120 and the air discharge line 110. The present disclosure is not restricted or limited by the structure and shape of the third hydrogen discharge line 140.

The third valve 230 is provided in the third hydrogen discharge line 140 and configured to selectively open or close the third hydrogen discharge line 140 on the basis of the third critical pressure different from the first critical pressure and the second critical pressure.

In this case, the process in which the third valve 230 selectively opens or closes the third hydrogen discharge line 140 on the basis of the third critical pressure is defined as a process in which the third valve 230 opens the third hydrogen discharge line 140 when the pressure of the hydrogen passing through the third hydrogen discharge line 140 (the anode pressure) is the third critical pressure or higher, and the third valve 230 closes the third hydrogen discharge line 140 when the pressure of the hydrogen passing through the third hydrogen discharge line 140 (the anode pressure) is lower than the third critical pressure.

Various valves capable of opening or closing the third hydrogen discharge line 140 may be used as the third valve 230. The present disclosure is not restricted or limited by the type and structure of the third valve 230.

According to an embodiment of the present disclosure, a check valve, which operates (opens or closes the third hydrogen discharge line) on the basis of the third critical pressure, may be used as the third valve 230.

Because the check valve, which may be automatically opened or closed on the basis of the third critical pressure, is used as the third valve 230 as described above, a separate logic and device for controlling a timing for opening or closing the third hydrogen discharge line 140 need not be provided. Therefore, it is possible to obtain an advantageous effect of simplifying the structure and operational structure of the third valve 230. According to another embodiment of the present disclosure, other valves such as a solenoid valve or a butterfly valve may be used as the third valve.

The third critical pressure of the third valve 230 may be variously changed in accordance with required conditions and design specifications. The present disclosure is not restricted or limited by the third critical pressure of the third valve 230.

According to an embodiment of the present disclosure, the second critical pressure may be defined to be higher than the first critical pressure, and the third critical pressure may be defined to be different from the second critical pressure and higher than the first critical pressure. For example, the third critical pressure may be defined to be higher than the second critical pressure.

Because the third critical pressure of the third valve 230 is defined to be higher than the second critical pressure, the first valve 210 and the second valve 220 may respectively open the first hydrogen discharge line 120 and the second hydrogen discharge line 130 in the state in which the third valve 230 closes the third hydrogen discharge line 140 in case that the discharge pressure of the hydrogen (the anode pressure) is lower than the third critical pressure.

In contrast, in case that the discharge pressure of the hydrogen (the anode pressure) is higher than the third critical pressure, the third valve 230 may additionally open the third hydrogen discharge line 140 in the state in which the first and second valves 210 and 220 respectively open the first and second hydrogen discharge lines 120 and 130. Meanwhile, the third valve 230 closes the third hydrogen discharge line 140 again when the discharge pressure of the hydrogen (anode pressure) is lower than the third critical pressure in the state in which the third valve 230 is opened.

In the embodiment of the present disclosure, the second valve 220 and the third valve 230 operate at different critical pressures as described above. Therefore, it is possible to quickly and accurately ensure a concentration of hydrogen in accordance with a required hydrogen concentration condition (a situation for ensuring a concentration of hydrogen) for the anode 102. For example, the second valve 220 and the third valve 230 may be opened simultaneously in a situation in which hydrogen needs to be rapidly purged from the anode 102 (e.g., a situation in which the fuel cell stack is initially started, a situation in which a concentration of hydrogen in the anode is rapidly decreased, or a situation in which the cathode is supercharged with air). During the general purge process, the third valve 230 may be closed, and only the second valve 220 may be opened.

A cross-sectional area of an orifice (a third orifice cross-sectional area) of the third valve 230 may be variously changed in accordance with required conditions and design specifications. The present disclosure is not restricted or limited by the cross-sectional area of the orifice of the third valve 230.

In this case, the cross-sectional area of the orifice of the third valve 230 may be understood as a cross-sectional area of a flow path (passageway) through which hydrogen passes when the third valve 230 is opened.

According to an embodiment of the present disclosure, the first valve 210 may have the first orifice cross-sectional area through which hydrogen passes, the second valve 220 may have the second orifice cross-sectional area different from the first orifice cross-sectional area, and the third valve 230 may have the third orifice cross-sectional area different from the first orifice cross-sectional area and the second orifice cross-sectional area. According to another embodiment of the present disclosure, the first orifice cross-sectional area of the first valve, the second orifice cross-sectional area of the second valve, and the third orifice cross-sectional area of the third valve may be equal to one another.

In particular, the second orifice cross-sectional area may be defined to be larger than the first orifice cross-sectional area (the first orifice cross-sectional area may be defined to be smaller than the second orifice cross-sectional area), and the third orifice cross-sectional area may be defined to be different from the second orifice cross-sectional area and larger than the first orifice cross-sectional area. For example, the third orifice cross-sectional area may be defined to be larger than the second orifice cross-sectional area.

Meanwhile, in the embodiment of the present disclosure illustrated and described above, the example has been described in which the hydrogen discharge valve part 200 includes the plurality of valves (e.g., the first valve 210, the second valve 220, and the third valve 230) respectively provided in the plurality of hydrogen discharge lines (e.g., the first hydrogen discharge line 120, the second hydrogen discharge line 130, and the third hydrogen discharge line 140). However, according to another embodiment of the present disclosure, only a single three-way valve 240' may be used to constitute a hydrogen discharge valve part 200'.

Figure 6:
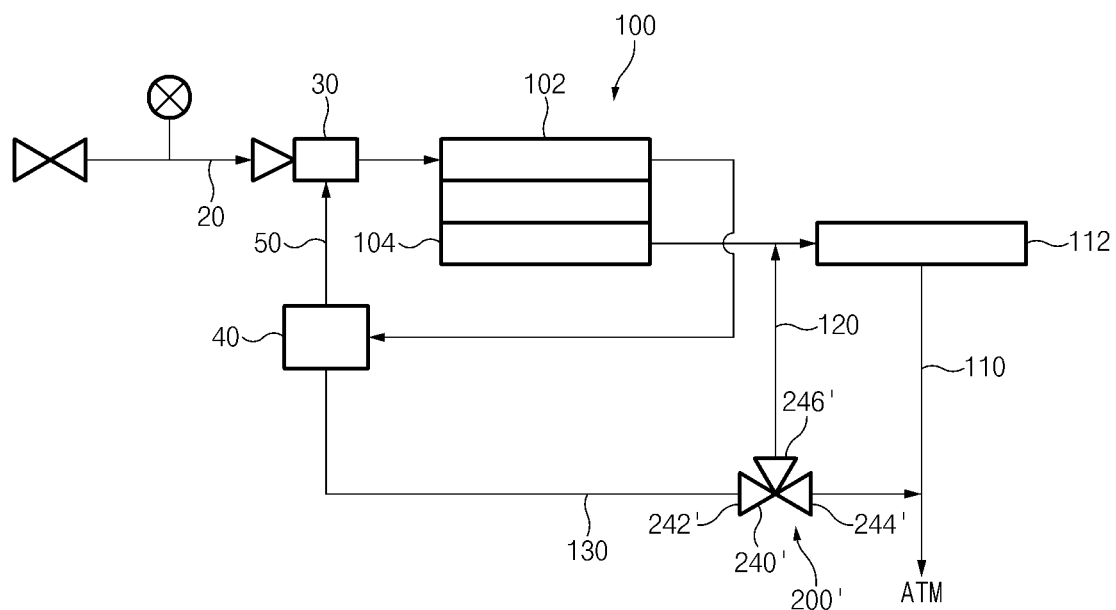
FIGS. 6 to 8 are views illustrating another embodiment of the hydrogen discharge valve part in the fuel cell system according to an embodiment of the present disclosure.
Figure 7:
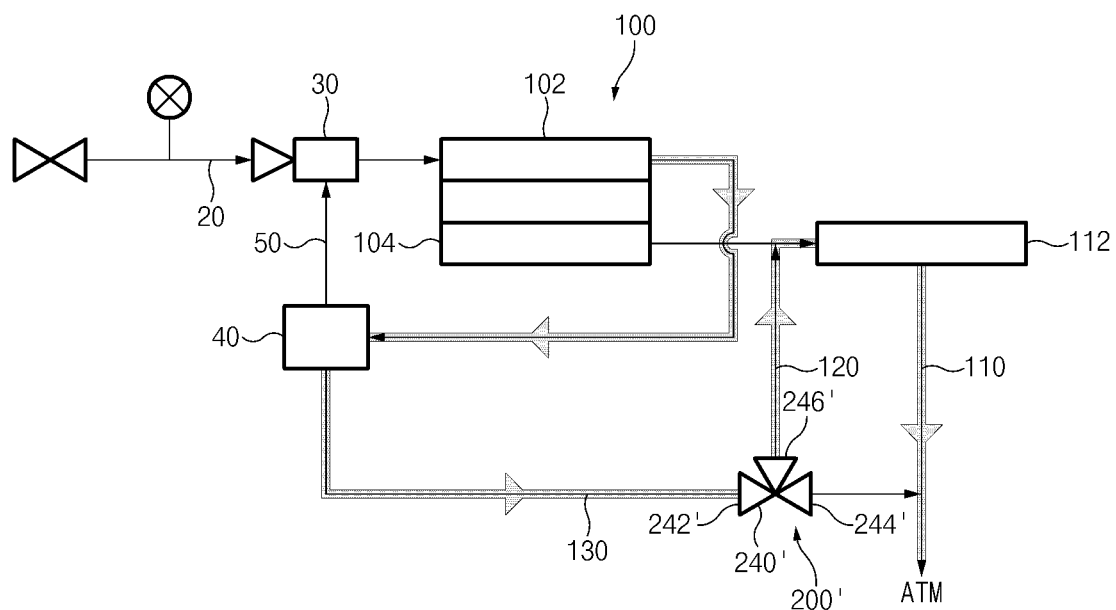
Figure 8:
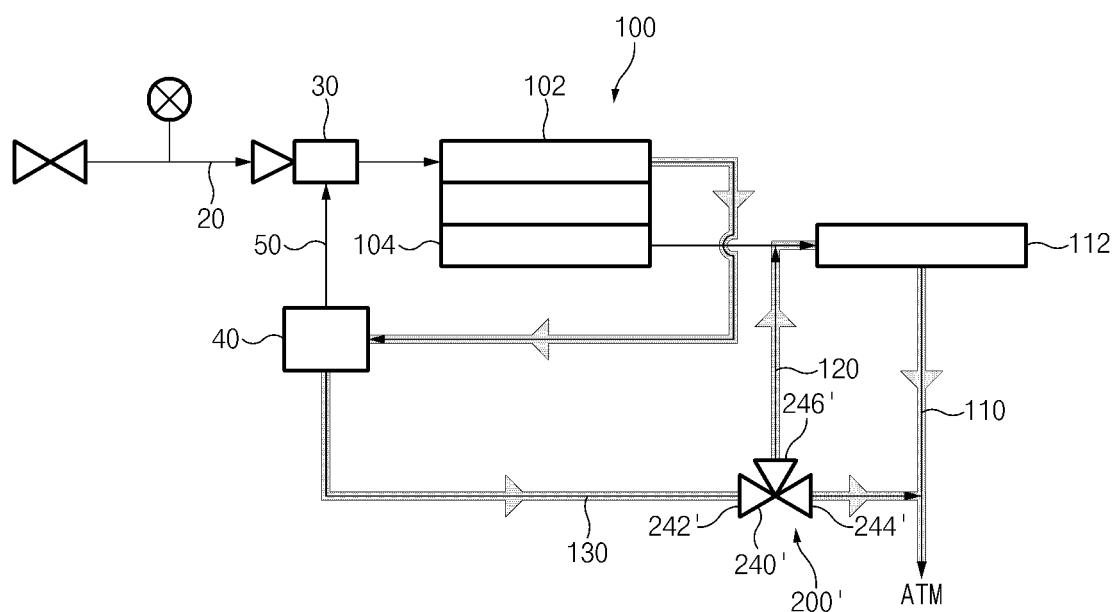

FIGS. 6 to 8 are views for explaining another embodiment of the hydrogen discharge valve part in the fuel cell system according to the embodiment of the present disclosure. Further, the parts identical and equivalent to the parts in the above-mentioned configuration are designated by the identical or equivalent reference numerals, and detailed descriptions thereof have been omitted.

Referring to FIGS. 6 to 8, according to an embodiment of the present disclosure, the hydrogen discharge valve part 200' includes the three-way valve 240' provided in the first hydrogen discharge line 120 and connected to the second hydrogen discharge line 130. The three-way valve 240' may include: a first port 242' connected to the first hydrogen discharge line 120 so that the hydrogen discharged from the fuel cell stack 100 is introduced into the first port 242'; a second port 246' connected to the first hydrogen discharge line 120 so that the hydrogen passing through the first port 242' is introduced into the first hydrogen discharge line 120 at the upstream side of the pressure adjuster 112, the second port 246' being configured to be selectively opened or closed on the basis of a first critical pressure; and a third port 244' connected to the second hydrogen discharge line 130 and configured to be selectively opened or closed on the basis of a second critical pressure different from the first critical pressure.

For example, the second port 246' and the third port 244' may be configured to be selectively opened in accordance with an opening ratio according to a preset critical pressure. The present disclosure is not restricted or limited by the structures and methods for opening or closing the second port 246' and the third port 244'.

According to an embodiment of the present disclosure, the second critical pressure of the third port 244' may be defined to be higher than the first critical pressure of the second port 246'.

Because the second critical pressure of the third port 244' is defined to be higher than the first critical pressure of the second port 246' as described above, only the second port 246' may be opened in the state in which the third port 244' is closed when the discharge pressure of the hydrogen (the anode pressure) is lower than the second critical pressure. The hydrogen (hydrogen and condensate water) discharged from the fuel cell stack 100 may be merged into the air discharge line 110 at the upstream side of the pressure adjuster 112.

In contrast, in case that the discharge pressure of the hydrogen (the anode pressure) is higher than the second critical pressure, the third port 244' may be additionally opened in the state in which the second port 246' opened. The hydrogen (hydrogen and condensate water) discharged from the fuel cell stack 100 may be merged into the air discharge line 110 at each of the upstream side and the downstream side of the pressure adjuster 112.

According to an embodiment of the present disclosure, the first critical pressure of the second port 246' may be defined to correspond to the differential pressure between the working pressure of the anode 102 and the working pressure of the cathode 104 (first critical pressure=working pressure of anode−working pressure of cathode).

For reference, the first critical pressure may be determined as a particular value because the differential pressure between the anode 102 and the cathode 104 needs to be always constantly maintained during the operation of the fuel cell stack. In this case, the reason why the differential pressure between the anode 102 and the cathode 104 needs to be always constantly maintained during the operation of the fuel cell stack is to operate the fuel cell under an optimum condition. In case of the occurrence of the differential pressure between the anode and the cathode, crossover may occur, which may cause a deterioration in durability of the fuel cell.

Because the first critical pressure of the second port 246' is defined to correspond to the differential pressure between the working pressure of the anode 102 and the working pressure of the cathode 104 as described above, the second port 246' may maintain the opened state of the first hydrogen discharge line 120 at ordinary times, and the condensate water may be mainly discharged along the first hydrogen discharge line 120 during the normal operation of the fuel cell stack 100.

In particular, the second critical pressure of the third port 244' may be defined to be higher than the maximum working pressure of the anode 102.

In particular, the second critical pressure may be defined as a pressure of the anode 102 during the purge process.

Because the second critical pressure of the third port 244' is defined to be higher than the maximum working pressure of the anode 102 as described above, the third port 244' may maintain the closed state of the second hydrogen discharge line 130 under a normal operating condition (general operating condition) of the fuel cell stack 100, and the third port 244' may temporarily open the second hydrogen discharge line 130 only during the purge process in which the working pressure of the anode 102 is set to be higher than the second critical pressure.

As described above, in the embodiment of the present disclosure, the first port 242', the second port 246', and the third port 244' of the three-way valve 240' are selectively opened or closed. Therefore, in accordance with the pressure of the anode 102 (the discharge pressure or flow rate of hydrogen), the path, through which hydrogen is discharged, may be defined along the first hydrogen discharge line 120 (the upstream side of the pressure adjuster) or defined along the first hydrogen discharge line 120 (the upstream side of the pressure adjuster) and the second hydrogen discharge line 130 (the downstream side of the pressure adjuster). Therefore, it is possible to smoothly discharge hydrogen at an appropriate flow rate in a state in which the fluctuations of pressures of the cathode 104 and the anode 102 may be minimized regardless of an operating condition of the fuel cell stack 100 (e.g., the normal operation vs. the purge process).

That is, referring to FIG. 7, when the first port 242' and the second port 246' are opened and the third port 244' is closed during the normal operation of the fuel cell stack 100, the hydrogen (hydrogen and condensate water) discharged from the fuel cell stack 100 may be merged into the air discharge line 110 at the upstream side of the pressure adjuster 112 along the first hydrogen discharge line 120 and then discharged to the outside along the air discharge line 110.

In contrast, as illustrated in FIG. 8, when all the first port 242', the second port 246', and the third port 244' are opened during the purge process, the hydrogen discharged from the fuel cell stack 100 may be merged into the air discharge line 110 at each of the upstream side and the downstream side of the pressure adjuster 112 along the first hydrogen discharge line 120 and the second hydrogen discharge line 130 and then discharged to the outside along the air discharge line 110.

According to the present disclosure as described above, it is possible to obtain an advantageous effect of improving stability and reliability.

In particular, according to the embodiment of the present disclosure, it is possible to obtain an advantageous effect of ensuring the smooth discharge of hydrogen from the fuel cell stack and improving the stability and reliability.

Among other things, according to the embodiment of the present disclosure, it is possible to selectively switch the discharge path for hydrogen (to define the discharge path for hydrogen along the upstream side of the pressure adjuster provided in the air discharge line or to define the discharge path for hydrogen along the upstream side and the downstream side of the pressure adjuster) on the basis of the pressure of the anode.

In addition, according to the embodiment of the present disclosure, it is possible to minimize the fluctuations of pressures of the cathode and the anode and stably ensure the output of the fuel cell stack.

In addition, according to the embodiment of the present disclosure, it is possible to obtain an advantageous effect of improving the durability of the fuel cell stack.

In addition, according to the embodiment of the present disclosure, it is possible to obtain an advantageous effect of more efficiently controlling the working pressures of the cathode and the anode and improving the degrees of freedom of the working pressures of the cathode and the anode.

In addition, according to the embodiment of the present disclosure, it is possible to obtain an advantageous effect of adjusting the discharge flow rate of hydrogen without providing a separate valve control logic, thereby simplifying the structure and improving the degree of design freedom and the spatial utilization.

While the embodiments have been described above, the embodiments are just illustrative and not intended to limit the present disclosure. It can be appreciated by those having ordinary skill in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A fuel cell system comprising:
    a fuel cell stack comprising an anode to which hydrogen is supplied, and a cathode to which air is supplied;
    an air discharge line through which the air discharged from the fuel cell stack is discharged into the atmosphere;
    a pressure adjuster provided in the air discharge line and configured to selectively open or close the air discharge line;
    a first hydrogen discharge line having a first end connected to the fuel cell stack, and a second end connected to the air discharge line at an upstream side of the pressure adjuster;
    a second hydrogen discharge line having a first end connected to the first hydrogen discharge line, and a second end connected to the air discharge line at a downstream side of the pressure adjuster; and
    a hydrogen discharge valve part configured to selectively open or close at least one of the first hydrogen discharge line or the second hydrogen discharge line based on a pressure of the anode.

2. The fuel cell system of claim 1, wherein the hydrogen discharge valve part comprises:
    a first valve provided in the first hydrogen discharge line and configured to selectively open or close the first hydrogen discharge line based on a first critical pressure; and
    a second valve provided in the second hydrogen discharge line and configured to selectively open or close the second hydrogen discharge line based on a second critical pressure different from the first critical pressure.

3. The fuel cell system of claim 2, wherein the second critical pressure is higher than the first critical pressure.

4. The fuel cell system of claim 2, wherein the first critical pressure is defined to correspond to a differential pressure between a working pressure of the anode and a working pressure of the cathode.

5. The fuel cell system of claim 2, wherein the second critical pressure is higher than a maximum working pressure of the anode.

6. The fuel cell system of claim 2, wherein the second critical pressure is defined as a pressure of the anode during a purge process of the fuel cell stack.

7. The fuel cell system of claim 2, wherein the first valve is a check valve configured to operate based on the first critical pressure, and the second valve is a check valve configured to operate based on the second critical pressure.

8. The fuel cell system of claim 2, wherein the first valve has a first orifice cross-sectional area through which the hydrogen passes, and the second valve has a second orifice cross-sectional area different from the first orifice cross-sectional area.

9. The fuel cell system of claim 8, wherein the second orifice cross-sectional area is larger than the first orifice cross-sectional area.

10. The fuel cell system of claim 2, comprising:
    a third hydrogen discharge line having a first end connected to the first hydrogen discharge line, and a second end connected to the air discharge line at a downstream side of the pressure adjuster,
    wherein the hydrogen discharge valve part comprises a third valve provided in the third hydrogen discharge line and configured to selectively open or close the third hydrogen discharge line based on a third critical pressure different from the first critical pressure and the second critical pressure.

11. The fuel cell system of claim 10, wherein the second critical pressure is higher than the first critical pressure, and the third critical pressure is different from the second critical pressure and higher than the first critical pressure.

12. The fuel cell system of claim 10, wherein:
the first valve has a first orifice cross-sectional area through which the hydrogen passes,
the second valve has a second orifice cross-sectional area different from the first orifice cross-sectional area, and
the third valve has a third orifice cross-sectional area different from the first orifice cross-sectional area and the second orifice cross-sectional area.

13. The fuel cell system of claim 12, wherein the second orifice cross-sectional area is greater than the first orifice cross-sectional area, and the third orifice cross-sectional area is different from the second orifice cross-sectional area and greater than the first orifice cross-sectional area.

14. The fuel cell system of claim 1, wherein the hydrogen discharge valve part comprises a three-way valve provided in the first hydrogen discharge line and connected to the second hydrogen discharge line, and
wherein the three-way valve comprises:
a first port connected to the first hydrogen discharge line so that the hydrogen discharged from the fuel cell stack is introduced into the first port;
a second port configured to guide the hydrogen passing through the first port to the first hydrogen discharge line at an upstream side of the pressure adjuster, the second port being configured to be selectively opened or closed based on a first critical pressure; and
a third port connected to the second hydrogen discharge line and configured to be selectively opened or closed based on a second critical pressure different from the first critical pressure.

15. The fuel cell system of claim 14, wherein the second critical pressure is higher than the first critical pressure.

16. The fuel cell system of claim 14, wherein the first critical pressure is defined to correspond to a differential pressure between a working pressure of the anode and a working pressure of the cathode.

17. The fuel cell system of claim 14, wherein the second critical pressure is higher than a maximum working pressure of the anode.

18. The fuel cell system of claim 14, wherein the second critical pressure is defined as a pressure of the anode during a purge process of the fuel cell stack.

* * * * *